United States Patent
Kim et al.

(10) Patent No.: US 10,312,487 B2
(45) Date of Patent: Jun. 4, 2019

(54) RECHARGEABLE BATTERY MODULE

(71) Applicant: SAMSUNG SDI CO., LTD., Yongin-si, Gyeonggi-do (KR)

(72) Inventors: Young-Deok Kim, Yongin-si (KR); Ji-Soon Lim, Yongin-si (KR); Shi-Dong Park, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 107 days.

(21) Appl. No.: 15/296,375

(22) Filed: Oct. 18, 2016

(65) Prior Publication Data
US 2017/0110698 A1   Apr. 20, 2017

(30) Foreign Application Priority Data

Oct. 19, 2015  (KR) .................. 10-2015-0145319

(51) Int. Cl.
*H01M 6/42*   (2006.01)
*H01M 2/10*   (2006.01)
*H01M 2/20*   (2006.01)
*H01M 10/04*  (2006.01)

(52) U.S. Cl.
CPC ....... *H01M 2/1077* (2013.01); *H01M 2/1022* (2013.01); *H01M 2/206* (2013.01); *H01M 10/04* (2013.01); *H01M 2/202* (2013.01); *H01M 2220/20* (2013.01)

(58) Field of Classification Search
CPC .. H01M 2/1077; H01M 2/1022; H01M 2/206; H01M 2/202; H01M 10/04; H01M 2220/20
See application file for complete search history.

(56) References Cited

U.S. PATENT DOCUMENTS

| | | |
|---|---|---|
| 2011/0183179 A1 | 7/2011 | Okada |
| 2015/0079451 A1 | 3/2015 | Jeong et al. |
| 2015/0079452 A1 | 3/2015 | Park et al. |
| 2015/0280184 A1* | 10/2015 | Utley .................. H01M 2/1077 429/99 |

FOREIGN PATENT DOCUMENTS

| | | |
|---|---|---|
| EP | 2843725 A1 | 3/2015 |
| EP | 2849252 A1 | 3/2015 |
| KR | 10-2015-0031095 A | 3/2015 |
| KR | 10-2015-0031861 A | 3/2015 |

OTHER PUBLICATIONS

European Extended Search Report dated Mar. 21, 2017, of the corresponding European Patent Application No. 16194552.2.

* cited by examiner

*Primary Examiner* — Raymond Alejandro
(74) *Attorney, Agent, or Firm* — Lee & Morse, P.C.

(57) ABSTRACT

A rechargeable battery module includes unit cells that are arranged in a first direction, a bus bar that electrically connects the unit cells, a pair of end plates that are spaced apart from each other along the first direction at opposite ends of the unit cells to support the unit cells, and at least one side plate between the pair of end plates and connected to the pair of end plates, the at least one side plate extending along the unit cells and spaced apart from the unit cells a predetermined distance, wherein the side plate includes a stepped portion facing the unit cells.

14 Claims, 6 Drawing Sheets

RECHARGEABLE BATTERY MODULE

CROSS-REFERENCE TO RELATED APPLICATION

Korean Patent Application No. 10-2015-0145319, filed on Oct. 19, 2015, in the Korean Intellectual Property Office, and entitled: "Rechargeable Battery Module," is incorporated by reference herein in its entirety.

BACKGROUND

1. Field

The present disclosure relates to a rechargeable battery module which accommodates a plurality of unit cells in a space where it is set by a side plate and an end plate.

2. Description of the Related Art

A rechargeable battery differs from a primary battery in that it can be repeatedly charged and discharged, while the latter is incapable of being recharged. Low-capacity rechargeable batteries are used in small portable electronic devices, e.g., mobile phones, notebook computers, and camcorders, while high-capacity rechargeable batteries can be used as a power source for driving motors, e.g., of a hybrid vehicle, an electric vehicle, and the like.

The rechargeable battery may be used in small electronic devices as a single cell battery or in motor-driving power sources, etc. as a battery module in which a plurality of battery cells are electrically connected or as a battery pack in which a plurality of battery modules are electrically connected. For example, a rechargeable battery module may be formed by arranging a plurality of unit cells in one direction, disposing end plates at opposite ends of the arranged direction of the unit cells, disposing side plates at opposite sides of the arranged direction, and welding the side plates to the end plates.

The rechargeable battery module is required to occupy a minimum space inside a device in which the rechargeable battery module is installed and to deliver a maximum output that maximizes its efficiency. However, in the rechargeable battery module, a thickness of the side plate thereof and a distance between the side plate and the unit cells are considerably limited.

SUMMARY

The present disclosure has been made in an effort to provide a rechargeable battery module that provides maximum output in a minimum space despite the structural limitation of a side plate thereof. In other words, the present disclosure provides a rechargeable battery module that maximizes efficiency.

An exemplary embodiment of the present disclosure provides a rechargeable battery module, including unit cells that are arranged in a first direction, a bus bar that electrically connects the unit cells, a pair of end plates that are spaced apart from each other along the first direction at opposite ends of the unit cells to support the unit cells, and at least one side plate between the pair of end plates and connected to the pair of end plates, the at least one side plate extending along the unit cells and spaced apart from the unit cells a predetermined distance, wherein the side plate includes a stepped portion facing the unit cells.

A plurality of stepped portions may be formed in the second direction.

The stepped portion may include a base that is flatly formed at the outermost side of the second direction, and at least one protruding portion that protrude toward the unit cells from the base.

The base and the protruding portion may be connected at a right angle.

The side plate may be provided with a through-hole adjacent to the unit cell.

A plurality of through holes may be formed along a third direction crossing the first and the second directions.

The stepped portion may be at each of the plurality of through holes.

The rechargeable battery module may further include an insulating sheet that is adhered to the protruding portion adjacent to the unit cell.

A height of the protrude portion may be about 30% to 40% of the thickness of the side plate.

The protruding portion may gradually decrease and protrude from the base to the unit cells.

The protruding portion may repeatedly be directed from the base to the unit cells and directed from the unit cells to an opposite side thereof.

The side plate may be formed of a metal sheet with a predetermined thickness, and the stepped portion may extend an entire thickness of the side plate in the second direction.

The side plate may include a flange that is bent at a lower end portion of a third direction crossing the first and the second direction to support the unit cells.

The flange may include a rib that protrudes in the third direction and extends in the first direction.

The rechargeable battery module may further include an end support that is provided between the end plate and an outermost unit cell and is formed of an insulator.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
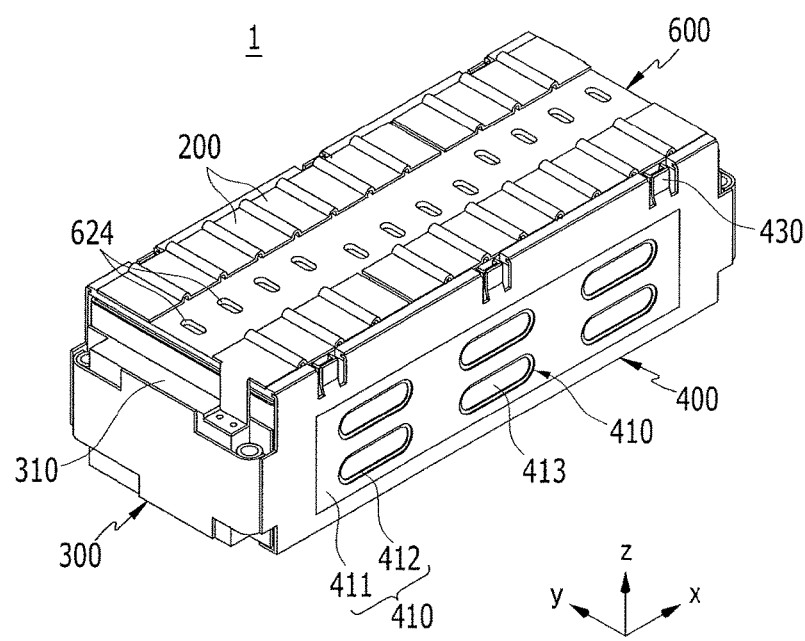
FIG. 1 illustrates a perspective view of a rechargeable battery module according to a first exemplary embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
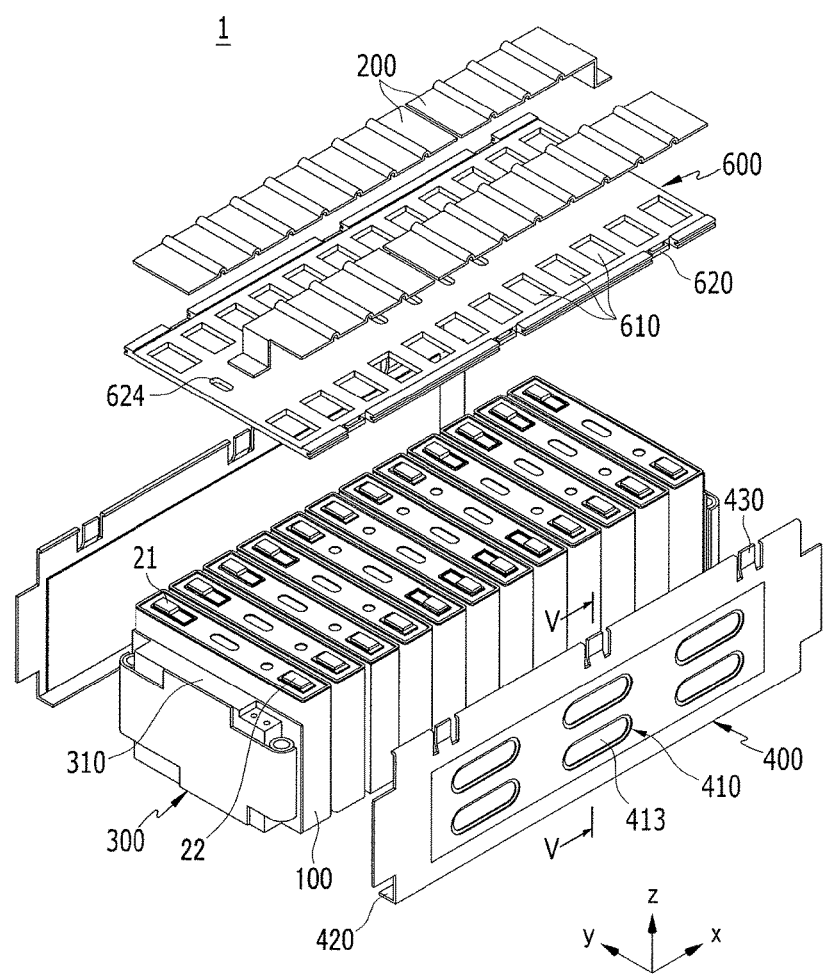
FIG. 2 illustrates an exploded perspective view of the rechargeable battery module in FIG. 1

FIG. 1 illustrates a perspective view of a rechargeable battery module according to a first exemplary embodiment of the present disclosure, and FIG. 2 illustrates an exploded perspective view of the rechargeable battery module in FIG. 1

Referring to FIGS. 1 and 2, a rechargeable battery module 1 of the first exemplary embodiment of the present disclosure may include unit cells 100 with corresponding rechargeable batteries, a bus bar 200 that electrically connects the unit cells 100, and end plates 300 and side plates 400 that support and accommodate the unit cells 100.

The unit cells 100 are disposed to be adjacent in a first direction (x-axis direction), and are electrically and structurally connected to each other to form the rechargeable battery module 1. The bus bar 200 electrically connects the unit cells 100, and is disposed on an upper portion of the rechargeable battery module 1. For example, the bus bar 200 may connect four neighboring unit cells 100 in parallel in the rechargeable battery module 1, and may connect the four parallel-connected unit cells 100 with another four (or more) neighboring parallel-connected unit cells 100 in series.

A pair of end plates 300 are provided, and the end plates 300 are disposed at opposite ends of the x-axis direction to respectively support outermost unit cells 100. For example, the end plates 300 support the unit cells 100 by interposing an end support 310 between opposite inner sides of a length direction (x-axis direction) of the rechargeable battery module 1. The end plate 300 is formed of metal, e.g., stainless still, and provides rigidity to the rechargeable battery module 1 at the outermost of the x-axis direction. The end support 310 supports the unit cells 100, and is formed of an electrical insulator to electrically insulate the end plate 300 from the unit cells 100.

A pair of side plates 400 are provided, and the side plates 400 are disposed at opposite sides of a second direction (y-axis direction) crossing the x-axis direction, i.e., the side plates 400 are spaced apart from each other along the second direction. The side plates 400 are connected to the end plates 300 and maintain a distance G (refer to FIG. 5) from the unit cells 100. For example, the side plates 400 support and accommodate the unit cells 100 at opposite sides of a width direction of the rechargeable battery module 1. The side plate 400 may include stepped portions 410 that are formed within the distance G, i.e., a distance between each stepped portion 410 of a side plate 400 and an adjacent unit cell 100 along the y-axis is defined as the distance G, as will be described in more detail below with reference to FIG. 5.

The unit cells 100 accommodated in a space set by the interconnected end plate 300 and the side plate 400 may be covered by a bus bar holder 600. The bus bar holder 600 may be provided with bus bar holes 610, and the bus bar 200 may be electrically connected to the unit cells 100 through the bus bar holes 610.

Figure 3:
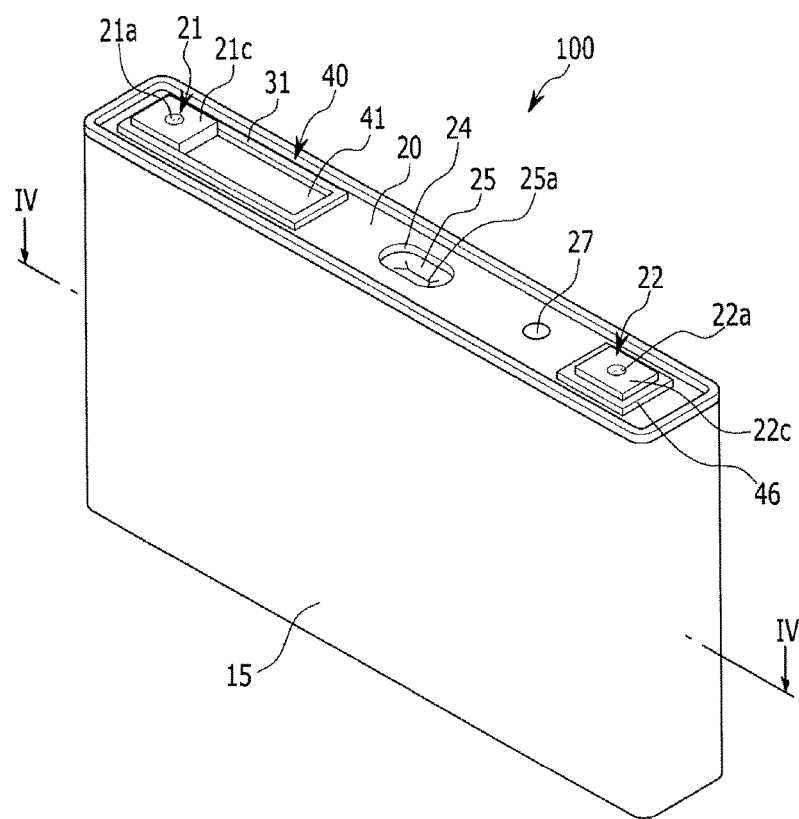
FIG. 3 illustrates an enlarged perspective view of a rechargeable battery in FIG. 2.
Figure 4:
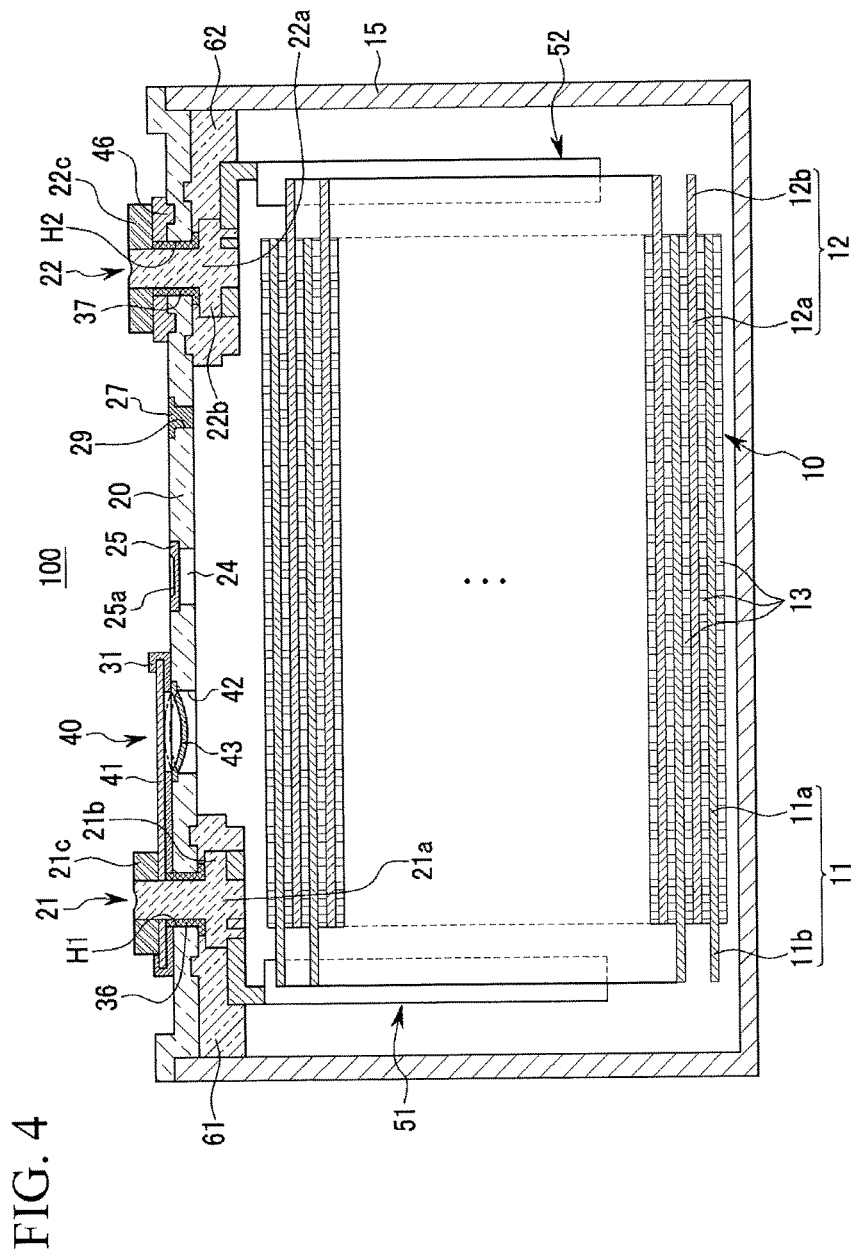
FIG. 4 illustrates a cross-sectional view of FIG. 3 taken along line IV-IV.

FIG. 3 illustrates a perspective view of a rechargeable battery in one unit cell 100, and FIG. 4 illustrates a cross-sectional view of FIG. 3 taken along line IV-IV. Referring to FIGS. 3 and 4, the unit cell 100 includes a rechargeable battery through which a current is charged or discharged.

As illustrated in FIGS. 3-4, each unit cell 100 may include an electrode assembly 10, a case 15 which accommodates the electrode assembly 10, a cap plate 20 that is coupled to an opening of the case 15, a first electrode terminal 21 (hereinafter referred to as "negative terminal") and a second electrode terminal 22 (hereinafter referred to as "positive terminal") installed on the cap plate 20, and an external short-circuit part 40 provided at the negative terminal 21.

For example, in the electrode assembly 10, a first electrode 11 (hereinafter referred to as "negative electrode") and a second electrode 12 (hereinafter referred to as "positive electrode") are disposed at opposite sides of a separator 13 which is an insulator, and the negative electrode 11, the separator 13, and the positive electrode 12 are spirally wound in a jelly-roll state. The negative electrode 11 and the positive electrode 12 respectively include coated regions 11a and 12a, where an active material is coated on a current collector of a metal plate, and uncoated regions 11b and 12b, where the active material is not coated thereon to expose the current collector. The uncoated region 11b of the negative electrode 11 is formed at one end portion of the negative electrode 11 along the spirally wound negative electrode 11. The uncoated region 12b of the positive electrode 12 is formed at one end portion of the positive electrode 12 along the spirally wound positive electrode 12. The uncoated regions 11b and 12b are disposed at opposite sides of the electrode assembly 10.

As an example, the case 15 may be roughly formed in a cuboid shape to accommodate the electrode assembly 10 and an electrolyte solution, and an opening is formed at one side of the cuboid to connect inner and outer spaces thereof. The opening is formed to allow the electrode assembly 10 to be inserted into the case 15.

The cap plate 20 is installed in the opening of the case 15 to seal the opening of the case 15. For example, the case 15 and the cap plate 20 may be formed of aluminum such that they are welded to each other.

In addition, an electrolyte injection opening 29, a vent hole 24, and terminal holes H1 and H2 are provided in the cap plate 20. The electrolyte injection opening 29 allows the electrolyte solutions to be injected into the case 15 after combining the case 15 with the cap plate 20. After injecting the electrolyte solution, the electrolyte injection opening 29 is sealed by a sealing cap 27.

The vent hole 24 is sealed by a vent plate 25 such that it discharges internal pressure of the unit cell 100. When the internal pressure of the unit cell 100 reaches a predetermined pressure, the vent plate 25 is ruptured to open the vent hole 24. The vent plate 25 has a notch 25a that induces the rupture.

Meanwhile, the bus bar holder 600 further includes a holder vent hole 624 corresponding to the vent hole 24. Accordingly, the internal pressure discharged through the vent hole 24 can be discharged to the outside of the rechargeable battery module 1 through the holder vent hole 624. For example, the internal pressure discharged to the vent hole 24 is not hindered by the bus bar holder 600.

The negative terminal 21 and the positive terminal 22 are installed in the terminal holes H1 and H2 of the cap plate 20, and are electrically connected to the electrode assembly 10. That is, the negative terminal 21 is electrically connected to the negative electrode 11 of the electrode assembly 10, and the positive terminal 22 is electrically connected to the positive electrode 12 of the electrode assembly 10. Accordingly, the electrode assembly 10 is drawn out of the case 15 through the negative terminal 21 and the positive terminal 22.

Since the negative terminal 21 and the positive terminal 22 have the same structure at an inner side of the cap plate 20, the same structures will be described together, and since they have different structures at an outer side of the cap plate 20, the different structures will be separately described.

The negative and positive terminals 21 and 22 may include rivet terminals 21a and 22a that are respectively installed in the terminal holes H1 and H2 of the cap plate 20, flanges 21b and 22b that are widely formed at the inner side of the cap plate 20 while being integrally formed with the respective rivet terminals 21a and 22a, and plate terminals 21c and 22c that are disposed outside of the cap plate 20 while being connected to the respective rivet terminals 21a and 22a by riveting or welding.

Negative and positive gaskets 36 and 37 are respectively installed between the rivet terminals 21a and 22a of the negative and positive terminals 21 and 22 and the inner sides of the terminal holes H1 and H2 to seal and electrically insulate between the rivet terminals 21a and 22a of the negative and positive terminals 21 and 22 and the cap palate 20. The negative and positive gaskets 36 and 37 are installed such that they are further extended between the flanges 21b and 22b and the inner side of the cap plate 20, and further seal and electrically insulate between the flanges 21b and 22b and the cap plate 20. For example, as the negative and positive terminals 21 and 22 are installed in the cap plate 20, the negative and positive gaskets 36 and 37 prevent the electrolyte solution from leaking through the terminal holes H1 and H2.

Negative and positive electrode lead tabs 51 and 52 electrically connect the negative and positive terminals 21 and 22 to the negative and positive electrodes 11 and 12 of the electrode assembly 10, respectively. For example, by combining the negative and positive electrode lead tabs 51 and 52 with lower end portions of the rivet terminals 21a and 22a, and then caulking the lower end portions, the negative and positive electrode lead tabs 51 and 52 are connected to the lower end portions of the rivet terminals 21a and 22a while being supported by the flanges 21b and 22b.

Negative and positive insulating members 61 and 62 are respectively installed between the negative and positive electrode lead tabs 51 and 52 and the cap plate 20 to electrically insulates the negative and positive lead tabs 51 and 52 and the cap plate 20. Further, the negative and positive insulating members 61 and 62 are combined to the cap plate 20 at one side thereof, and enclose the negative and positive lead tabs 51 and 52, the rivet terminals 21a and 22a, and flanges 21b and 22b, thereby stabilizing their connection structure.

The external short-circuit part 40 will be described in connection with the plate terminal 21c of the negative terminal 21, and a top plate 46 will be described in connection with the plate terminal 22c of the positive terminal 22.

The external short-circuit part 40 adjacent to the negative terminal 21 may include a short-circuited tab 41 and a short-circuited member 43 that are separated or short-circuited depending on the internal pressure of the unit cell. The short-circuit tab 41 is disposed outside of the cap plate 20 with an insulating member 31 therebetween while being electrically connected to the rivet terminal 21a of the negative terminal 21.

The insulating member 31 is disposed between the short-circuit tab 41 and the cap plate 20 to electrically insulate the short-circuit tab 41 from the cap plate 20. For example, the cap plate 20 maintains an electrically insulated state with the negative terminal 21.

By combining the short-circuit tab 41 and the plate terminal 21c with an upper end portion of the rivet terminal 21a and then caulking the upper end portion, the short-circuit tab 41 and the plate terminal 21c are fastened to the upper end portion of the rivet terminal 21a. Thus, the short-circuit tab 41 and the plate terminal 21c are fastened to the cap plate 20 while interposing the insulating member 31 therebetween.

The short-circuit member 43 is installed in a short-circuit hole 42 which is formed in the cap plate 20. While being connected to the negative terminal 21, the short-circuit tab 41 is disposed to be extended along the outside of the short-circuit member 43. Thus, the short-circuit tab 41 and the short-circuit member 43 correspond to the shot-circuit hole 42, face each other to maintain a separated state therebetween (solid line state), and may form a short-circuit state (imaginary line state) in which the short-circuit member 43 is inversely deformed when the internal pressure of the unit cell 100 increases.

The top plate 46 adjacent to the positive terminal 22 electrically connects the plate terminal 22c of the positive terminal 22 and the cap plate 20. For example, the top plate 46 is interposed between the plate terminal 2c and the cap plate 20, and is penetrated by the rivet terminal 22a. Thus, by combining the top plate 46 and the plate terminal 22c with an upper end portion of the rivet terminal 22a and then caulking the upper end portion, the top plate 46 and the plate terminal 22c are fastened to the upper end portion of the rivet terminal 22a. The plate terminal 22c is disposed at the outside of the cap plate 20 while interposing the top plate 46 therebetween.

The positive electrode gasket 37 is installed such that it is further extended between the rivet terminal 22a and the top plate 46. For example, the positive electrode gasket 37 prevents the rivet terminal 22a and the top plate 46 from being directly electrically connected each other. In other words, the rivet terminal 22a is electrically connected to the top plate 46 through the plate terminal 22c.

Figure 5:
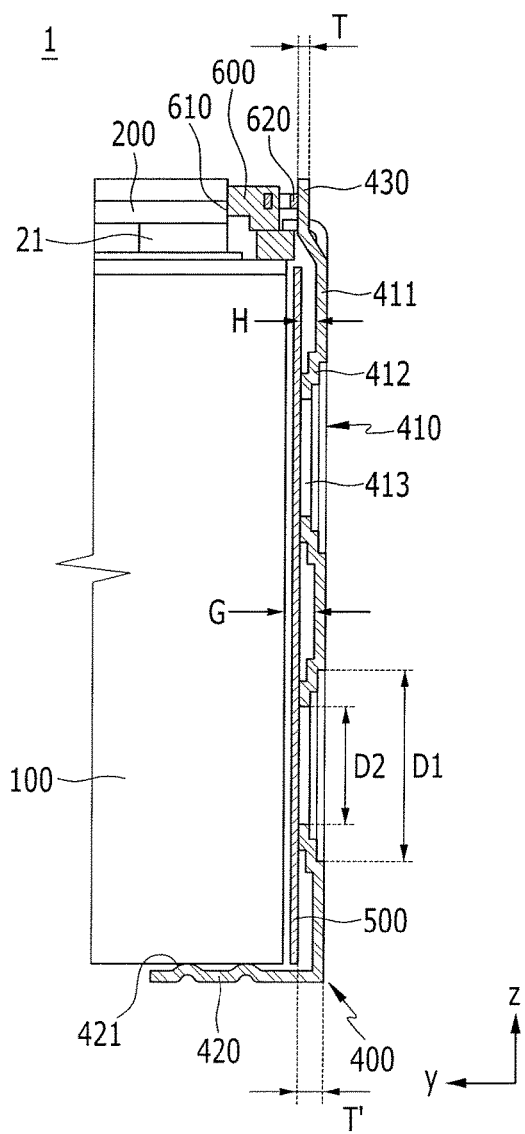
FIG. 5 illustrates a cross-sectional view of FIG. 2 taken along line V-V.

FIG. 5 illustrates a cross-sectional view of FIG. 2 taken along line V-V.

Referring to FIGS. 1-2 and 5, in the rechargeable battery module 1 of the first exemplary embodiment, the plurality of stepped portions 410 may be formed in the side plate 400 along the second direction (y-axis direction), i.e., each stepped portion 410 may define a through-hole 413 through the side plate 400 to have a depth along the second direction. For example, each stepped portion 410 includes a base 411 which is flatly formed at the outermost side of the second direction (y-axis direction) and at least one protruding portion 412 that protrudes toward the unit cell 100 from the base 411. That is, the protruding portion 412 may gradually decrease and protrude from the base 411 toward the unit cells 100.

In detail, as illustrated in FIGS. 1 and 5, the base 411 may define at least a portion of the flat portion of the side plate 400, e.g., a base 411 of each stepped portion 410 may contact a base 411 of an adjacent stepped portion 410 to define at least a portion of the flat portion of the side plate 400. Further, the protruding portion 412 may have a step shape extending from the base 411 toward the unit cell 100. For example, as illustrated in FIG. 1, the protruding portion 412 may have a closed shape, e.g., an oval or circular shape. For example, as illustrated in FIG. 5, a first end of the protruding portion 412 contacts the base 411, while a second end of the protruding portion 412 contacts an insulating sheet 500 on the unit cell 100, e.g., a first diameter D1 defined by the first end of the protruding portion 412 along a third direction (z-axis) may be longer than a second diameter D2 defined by the second end of the protruding portion 412 along the third direction. For example, as illustrated in FIG. 5, the protruding portion 412 may have two steps that are gradually recessed along the y-axis direction. As further illustrated in FIG. 5, the base 411 of the stepped portion 410 and the protruding portion 412 are connected at a right angle, i.e., the stepped portion 410 and the first end of the protruding portion 412 are connected at a right angle.

The side plate 400 is provided with the through-hole 413 in the protruding portion 412 adjacent to the unit cell 100. For example, the through-hole 413 is formed in the innermost protruding portion 412 to reduce the weight of the side plate 400. In other words, the second diameter D2 defined by the second end of the protruding portion 412 defines the through-hole 413 of the side plate 400. A plurality of through-holes 413 may be provided along the x-axis direction and the z-axis direction. The plurality of the through holes 413 may further reduce the weight of the side plate 400 while maintaining the rigidity of the side plate 400.

The stepped portion 410 is provided to correspond to each of the plurality of the through-holes 413, and connects the base 411 and the protruding portion 412 at the right angle, thereby preventing a spring back of the side plate 400 which is formed of a thin plate. For example, the stepped portion 410 may further strengthen the rigidity of the side plate which can be weakened due to the through-hole 413.

A protrusion height H that the protruding portion 412 is protruded toward the unit cell 100 may be about 30% to about 40% of the thickness T of the side plate 400. As an example, if the side plate 400 has a thickness T of about 0.8 mm along the y-axis, the protrusion height H along the y-axis may be about 0.24 mm to about 0.32 mm, e.g., about 0.30 mm.

If the protrusion height H of the protruding portion 412 is greater than about 40% of the thickness T of the side plate 400, a crack may occur around the stepped portion 410. If the protrusion height H of the protruding portion 412 is less than about 30% of the thickness T of the side plate, it may be difficult to substantially strengthen the rigidity at the stepped portion 410.

The side plate 400 is formed of a thin plate of a metal sheet with a predetermined thickness T, e.g., about 0.8 mm. For example, the side plate 400 may be formed of a thin plate of stainless steel. Substantially, since the stepped portion 410 is formed on a predetermined portion of the side plate 400 and increases an entire thickness T' of the y-axis direction within the distance G, it may maintain a shape of the thin plate metal sheet. As such, the side plate 400 may be formed of a thin plate, and may accommodate and support the unit cells 100 while maintaining the rigidity within the narrow distance G between the unit cells 100 and the side plate 400, thereby maximizing optimization of the rechargeable battery module 1.

The insulating sheet 500 may be further provided between the side plate 400 and the unit cells 100. The insulating sheet 500 electrically insulates the side plate 400 and the unit cells 100. In this case, a fine gap may be formed between the insulating sheet 500 and the unit cells 100. As an example, the insulating sheet 500 may be adhered to the protruding portion 412 most adjacent to the unit cell 100 in the side plate 400, i.e., to the second end of the protruding portion 412. The insulating sheet 500 may be adhered to the protruding portion 412 of the side plate 400 by a double-sided adhesive tape.

The side plate 400 may further include a flange 420 that supports the, e.g., bottom of the, unit cells 100. The flange 420 is bent in the y-axis direction from a lower end portion of a third direction (z-axis direction) crossing the x-axis and y-axis directions. In addition, the flange 420 may further include a rib 421 which protrudes in the z-axis direction and extends in the x-axis direction. As an example, the rib 421 is formed to have a semi-circular shape with two lines on the flange 420, and stably supports the lower end portion of the unit cells 100.

The flange 420 allow a lower plate supporting the lower end portion of the unit cells 100 to be removed in the rechargeable battery module 1, thereby reducing the weight of the rechargeable battery module 1. Further, when the rechargeable battery module 1 is installed in a system (e.g., electric vehicle), the flange 420 allows the unit cells 100 to be directly adhered to a cooling device, thereby realizing effective cooling.

Moreover, the side plate 400 is provided with a connecting portion 430 incised on an upper end of an opposite side of the flange 420. The connecting part 430 is formed to be bent toward the bus bar holder 600 from the base 411 of the side plate 400 to be elastically supported to the bus bar holder 600. As an example, the connecting portion 430 may be welded and connected to a bracket 620 that is provided at a position corresponding to the bus bar holder 600. When the bus bar holder 600 is formed of synthetic resin which is an insulator, the bracket 620 is provided in the bus bar holder 600 by insert molding.

The rechargeable battery module 1 is completed by covering the unit cells 100 with the bus bar holder 600, connecting the unit cells 100 to the bus bar 200 through the bus bar hole 610, and welding the connecting portion 430 of the side plate 400 to the bracket 620 of the bus bar holder 600 after connecting the end plate 300 and the side plate 400 and then accommodating and supporting the unit cells 100. For example, the unit cells 100 are supported and accommodated by the end plate 300 and the side plate 400 at the side thereof, by the bus bar holder 600 at the upper portion thereof, and by the flange 420 of the side plate 400 at the lower portion thereof.

A second exemplary embodiment of the present disclosure will now be described. For convenience, the same constituent elements as in the first exemplary embodiment will be omitted and different constituent elements will be described.

Figure 6:
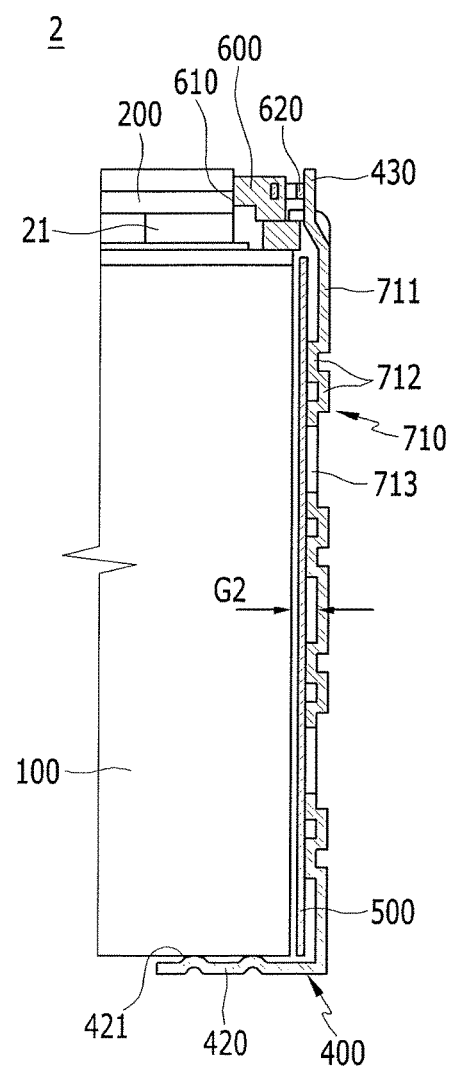
FIG. 6 illustrates a partial cross-sectional view of a rechargeable battery module according to a second exemplary embodiment of the present disclosure.

FIG. 6 illustrates a partial cross-sectional view of a rechargeable battery module according to a second exemplary embodiment of the present disclosure. Referring to FIG. 6, in a side plate 700 of a rechargeable battery module 2 according to the second exemplary embodiment, a protruding portion 712 of a stepped portion 710 is directed to the unit cells 100 from a base 711, and repeatedly protrudes toward the opposite side of the unit cells 100.

That is, compared to the first exemplary embodiment, the second exemplary embodiment may strengthen the rigidity of the side plate 700 by effectively forming the stepped portion 710 and the protruding portion 712 within a narrow distance G2 even when the distance G2 between the unit cells 100 and the side plate 700 is narrow.

According to an embodiment of the present disclosure, a stepped portion is formed in the side plate that maintains an interval from the unit cells, thereby maintaining rigidity and flatness of the side plate. Accordingly, the rechargeable battery module according to the embodiment of the present disclosure may provide the maximum output in the minimum space despite structural limitations of the side plate.

That is, according to the embodiment of the present disclosure, efficiency of the rechargeable battery module may be maximized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A rechargeable battery module, comprising:
   unit cells arranged in a first direction;
   a bus bar that electrically connects the unit cells;
   a pair of end plates spaced apart from each other along the first direction at opposite ends of the unit cells to support the unit cells; and
   at least one side plate between the pair of end plates and connected to the pair of end plates, the at least one side plate extending along the unit cells and spaced apart from the unit cells a predetermined distance,
   wherein the at least one side plate includes:
      stepped portions facing the unit cells, the stepped portions including a flat base at an outermost side of the at least one side plate, and at least one protruding portion that protrudes toward the unit cells from the flat base along a second direction crossing the first direction, and
      a through-hole adjacent to the unit cells, and
   wherein an insulating sheet is adhered to the at least one protruding portion and adjacent to the unit cells.

2. The rechargeable battery module as claimed in claim 1, wherein the stepped portions have depths in a second direction crossing the first direction.

3. The rechargeable battery module as claimed in claim 1, wherein the flat base and the protruding portion are connected at a right angle.

4. The rechargeable battery module as claimed in claim 1, wherein the at least one side plate includes a plurality of through holes along a third direction crossing the first and the second directions.

5. The rechargeable battery module as claimed in claim 4, wherein one stepped portion corresponds to each of the plurality of through holes.

6. The rechargeable battery module as claimed in claim 1, wherein a height of the at least one protruding portion along the second direction is about 30% to about 40% of a thickness of the at least one side plate along the second direction.

7. The rechargeable battery module as claimed in claim 1, wherein the at least one protruding portion gradually decreases and protrudes from the flat base to the unit cells.

8. The rechargeable battery module as claimed in claim 1, wherein the at least one protruding portion is repeatedly directed from the flat base to the unit cells and directed from the unit cells to an opposite side thereof.

9. The rechargeable battery module as claimed in claim 1, wherein:
   the at least one side plate is a metal sheet with a predetermined thickness, and
   the stepped portions extend along an entire thickness of the at least one side plate in a second direction crossing the first direction.

10. The rechargeable battery module as claimed in claim 1, further including a flange along bottoms of the unit cells to support the bottoms of the unit cells, the flange being connected to a lower end portion of the at least one side plate to extend in a second direction crossing the first direction.

11. The rechargeable battery module as claimed in claim 10, wherein the flange includes a rib that protrudes in a third direction crossing the first and second direction, the rib extending in the first direction.

12. The rechargeable battery module as claimed in claim 1, further comprising an end support between the end plate and an outermost unit cell, the end support being an insulator.

13. The rechargeable battery module as claimed in claim 1, further comprising an insulating sheet between the at least one side plate and the unit cells.

14. A rechargeable battery module, comprising:
   unit cells arranged in a first direction;
   a bus bar that electrically connects the unit cells;
   a pair of end plates spaced apart from each other along the first direction at opposite ends of the unit cells to support the unit cells; and
   at least one side plate between the pair of end plates and connected to the pair of end plates, the at least one side plate extending along the unit cells and spaced apart from the unit cells a predetermined distance,
   wherein the at least one side plate includes stepped portions facing the unit cells, and
   wherein the stepped portions include:
      a flat base at an outermost side of the at least one side plate, the flat base being parallel with the at least one side plate, and
      at least one protruding portion that protrudes toward the unit cells from the flat base along a second direction crossing the first direction, a first edge of the at least one protruding portion being connected to the flat base, and a second edge of the at least one protruding portion being opposite the first edge and spaced apart from the unit cells along the second direction to have an empty space therebetween.

* * * * *